Feb. 27, 1940.   G. W. PACKER   2,191,621
APPARATUS FOR TRANSPORTING MATERIAL IN MINES
Filed Sept. 17, 1937   2 Sheets-Sheet 1
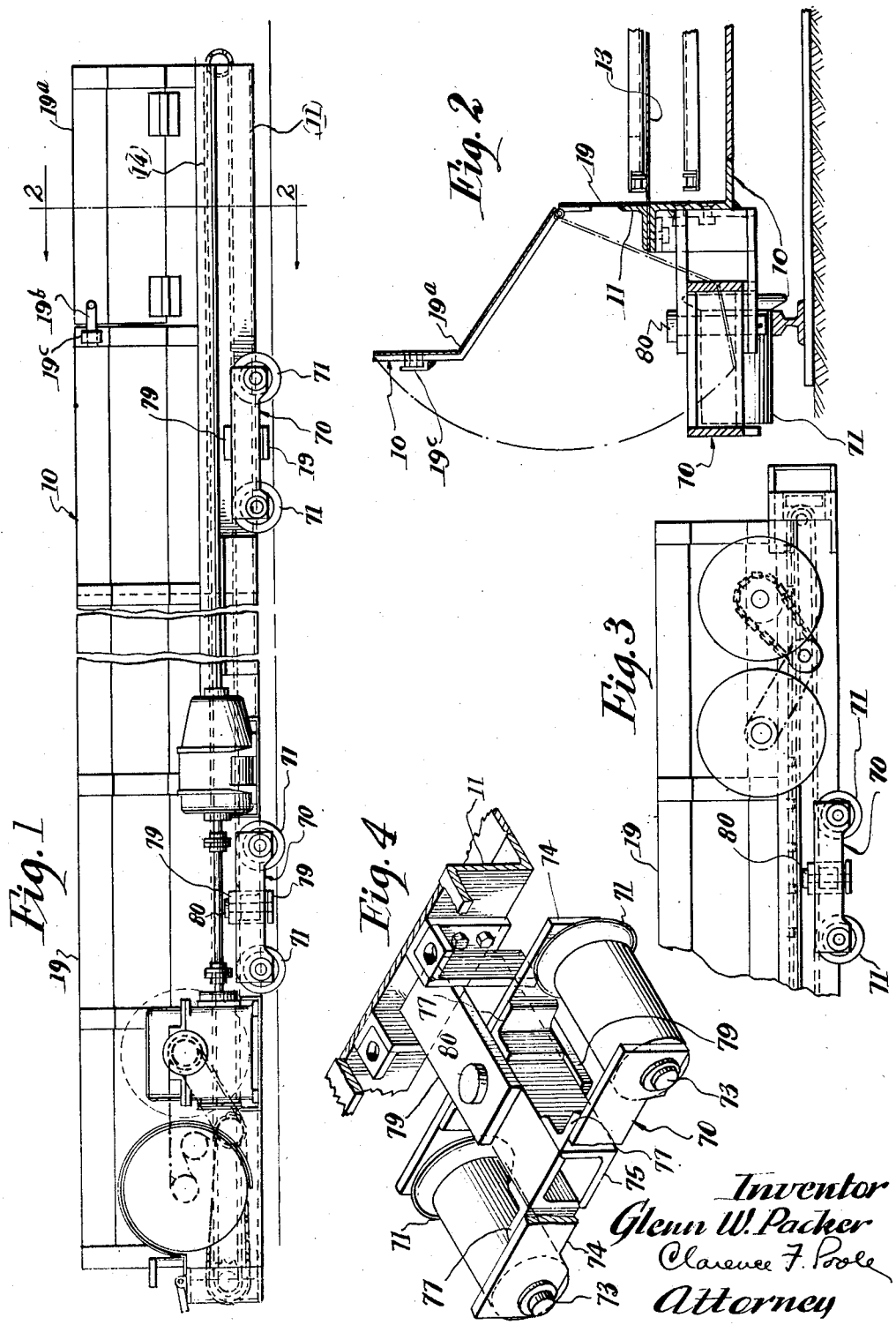
Inventor
Glenn W. Packer
Clarence F. Poole
Attorney

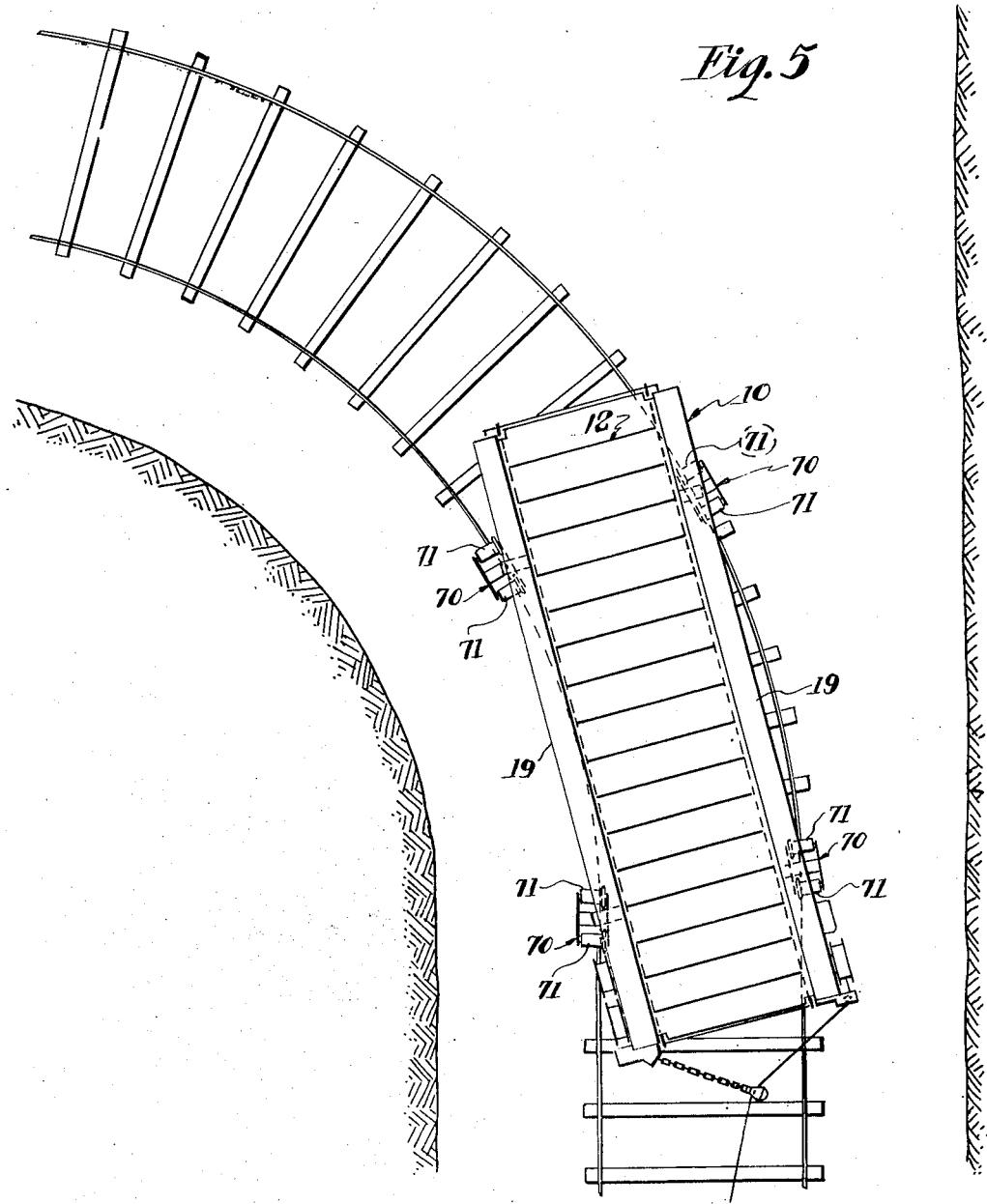

Patented Feb. 27, 1940

2,191,621

UNITED STATES PATENT OFFICE 2,191,621

APPARATUS FOR TRANSPORTING MATERIAL IN MINES

Glenn W. Packer, Chicago, Ill., assignor to Goodman Manufacturing Company, Chicago, Ill., a corporation of Illinois Application September 17, 1937, Serial No. 164,278

4 Claims. (Cl. 105—179)

This invention relates to improvements in apparatus for transporting material in mines and more particularly to a new and improved car having a conveyer therein which is adapted for use in thin seams of coal.

This invention relates to subject matter which is somewhat similar to that disclosed in an application Serial No. 131,397, filed by Timothy F. McCarthy on March 17, 1937, and now Patent No. 2,143,522, but differs from said invention in the mounting of the car frame for movement along the track and in that the car is self-propelled.

The principal objects of my invention are to provide a novel truck mounting for a car of the class described which is of a simplified, efficient, and compact arrangement to permit it to readily negotiate curves of a relatively small radius without derailing, and with a minimum overhang of the car.

Other objects of my invention will appear from time to time as the accompanying specification proceeds.

My invention may be more clearly understood with reference to the accompanying drawings wherein:

Figure 1 is a fragmentary view in side elevation of a conveyer car constructed in accordance with my invention;

Figure 2 is a fragmentary sectional view taken substantially along lines 2—2 of Figure 1;

Figure 3 is a fragmentary view in side elevation of the rearward portion of the car, drawn to a reduced scale, showing the opposite side of the car from that shown in Figure 1;

Figure 4 is an enlarged isometric view of one of the trucks showing certain details thereof and a means for mounting it on the car frame; and Figure 5 is a diagrammatic plan view of the car showing it negotiating a curve in a mine.

In the drawings a car designated generally by reference character 10 is provided. This car may be of a sectional construction to permit its extension so that its capacity may be increased where desired, and includes a frame 11 having a conveyer 12 extending along the central portion thereof in a manner similar to that disclosed in the aforementioned McCarthy application.

The conveyer 12, as herein shown, includes a plate 13 extending along the central portion of said frame between side plates 19, 19. Said side plates extend upwardly above the outer sides of said plate and downwardly beneath said plate and may be of an extensible construction to permit the height and capacity of the car to be varied and, as herein shown, have outwardly flared upper ends.

A portion 19a of each side wall at the receiving end of the conveyer is herein shown as being hinged at its lower end in a usual manner so it may be let down to permit the car to be readily loaded by hand (see Figures 1 and 2). Said portions are locked in an upright position by means of a locking lever 19b engaging an upwardly opening slot formed by a member 19c secured to the side 19.

With reference now in particular to Figure 4 and the novel supporting means for the frame 11 whereby it may negotiate curves of a relatively short radius, and whereby a portion of the body of the car may be recessed between the track wheels, two pairs of trucks 70, 70 are provided, and two of said trucks are mounted on each side of the machine on opposite sides of the transverse center line thereof. Inasmuch as the construction and connection of each one of these trucks to the car frame is substantially the same, one only will herein be described. Each of said trucks is provided with a pair of parallel spaced track wheels 71, 71 having a relatively wide tread, the width of which tread is equal to approximately one and one-half times the diameter of said track wheel. Said track wheels are each mounted on an axle 73 which axles are mounted at their ends in a frame for said truck which includes a pair of longitudinally extending parallel spaced support members 74, 74 which are secured to and extend from opposite sides of a box-like central member 75. Said box-like member is formed from a pair of angle irons secured together at the ends of the legs thereof in a suitable manner, such as welding. Angle irons 77, 77 secured to opposite sides of said box-like member adjacent opposite ends thereof are provided to form a means to which said longitudinally extending members may be suitably secured.

Each truck 70 is spaced laterally from the side of the frame 11 and is mounted thereon between a pair of parallel spaced supporting members 79, 79 secured to and extending laterally from said frame and engaging the upper and lower sides of the box-like central member 75. A pin 80, extending through said members and box-like central member, pivotally connects said truck to said bracket for movement about a vertical axis which, as herein shown, is disposed between said track wheels and within the boundaries of the latter.

It may be seen from the foregoing that the truck frame 11 is recessed below the tops of the wheels 71, 71 and that the trucks 70, 70 are individually pivoted for movement about vertical axes spaced from the lateral boundaries of said frame 11 which permits a low over-all height of the machine to be attained so the car may enter working places of low head room. It may also be seen that the two wheels supporting each truck cause it to pivot about the axis of the pin 80 and follow a curved track, and that this individual pivotal mounting of each truck enables the car to readily negotiate relatively sharp turns without derailing and with a minimum of overhang, as may be seen with reference to Figure 5.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim:

1. In a track mounted car of the class described, a car frame including a material carrying body, a truck mounting for said body adapted to permit the car to operate in places of low headroom and negotiate curves of a relatively short radius with a minimum of overhang of the ends of the car over the rails including a plurality of independently pivotally movable trucks spaced from the sides of said body and having pivotal supporting connection with the sides of said body on vertical pivotal pins spaced laterally from the sides of said body, each of said trucks including a pair of parallel spaced track wheels, the tread of which track wheels is wider than the diameter of said wheels, said pivotal pins being disposed between said track wheels and within the lateral boundaries thereof, and the major portion of said pins being disposed above the lower margins of said body.

2. In a car of the class described, a frame including a material carrying body, a truck mounting for said body adapted to permit the car to operate in places of low headroom and negotiate curves of a relatively short radius with a minimum of overhang of the ends of the car over the rails including a plurality of individually independently pivotally movable trucks, each of said trucks including two parallel spaced track wheels having said body recessed below the upper extremities thereof, said trucks each having pivotal connection with opposite sides of said body for movement about parallel vertical axes spaced laterally from said body, and said track wheels each having a relatively wide tread, the width of which is greater than the diameter of said wheels.

3. In a car of the class described, a frame including a material carrying body, a truck mounting for said body adapted to permit the car to operate in places of low headroom and negotiate curves of a relatively short radius including a plurality of individually independently pivotally movable trucks for supporting said body, each of said trucks including a frame including a pair of parallel spaced frame members having two parallel spaced wheel axles mounted therebetween, a track wheel mounted on each of said axles, said track wheel having a relatively wide tread, the width of which is greater than the diameter of said wheel, brackets projecting laterally from said body and extending above and below said truck frame, and a pivotal pin for pivotally connecting each of said truck frames with each of said brackets.

4. In a car of the class described, a frame including a material carrying body, a truck mounting for said body adapted to permit the car to operate in places of low headroom and negotiate curves of a relatively short radius including a plurality of individually independently pivotally movable trucks for supporting said body, each of said trucks including a frame including a pair of parallel spaced frame members having two parallel spaced wheel axles mounted therebetween, a track wheel having a relatively wide tread mounted on each of said axles, the width of tread of which track wheel is greater than the diameter of said wheel, brackets projecting laterally from said body and extending above and below said truck frame, and a pivotal pin pivotally connecting each of said truck frames with each of said brackets, said pin being disposed midway between said track wheels and within the lateral boundaries thereof, and having a major portion disposed above the bottom of said body.

GLENN W. PACKER.